(12) United States Patent
Benkert et al.

(10) Patent No.: US 10,211,453 B2
(45) Date of Patent: Feb. 19, 2019

(54) STORAGE STRUCTURE OF AN ELECTRICAL ENERGY STORAGE CELL

(71) Applicant: Siemens Aktiengesellschaft, Munich (DE)

(72) Inventors: Katrin Benkert, Schwaig (DE); Thomas Soller, Deggendorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 895 days.

(21) Appl. No.: 14/411,975

(22) PCT Filed: Jun. 3, 2013

(86) PCT No.: PCT/EP2013/061395
§ 371 (c)(1),
(2) Date: Dec. 30, 2014

(87) PCT Pub. No.: WO2014/005773
PCT Pub. Date: Jan. 9, 2014

(65) Prior Publication Data
US 2015/0171422 A1   Jun. 18, 2015

(30) Foreign Application Priority Data
Jul. 3, 2012   (DE) .......... 10 2012 211 474

(51) Int. Cl.
H01M 4/36 (2006.01)
H01M 4/38 (2006.01)
(Continued)

(52) U.S. Cl.
CPC .......... *H01M 4/366* (2013.01); *H01M 4/134* (2013.01); *H01M 4/38* (2013.01); *H01M 4/52* (2013.01);
(Continued)

(58) Field of Classification Search
None
See application file for complete search history.

(56) References Cited

U.S. PATENT DOCUMENTS 3,819,413 A   6/1974 Nippe
6,291,100 B1 * 9/2001 Doddapaneni ........ H01M 4/131
429/217
(Continued)

FOREIGN PATENT DOCUMENTS

CN   1871728 A   11/2006
CN   102473987 A   5/2012
(Continued)

OTHER PUBLICATIONS

Lorente E. et al; "Conceptual design and modelling of the Steam-Iron process and fuel cell integrated system"; International Journal of Hydrogen Energy, Elsevier Science Publishers B.V., Barking; vol. 34; No. 13; pp. 5554-5562; ISSN: 0360-3199; DOI: 10.1016/J.IHYDENE.2009.04.062; XP026211758; 2009; GB; Jul. 1, 2009.

Primary Examiner — Maria Laios
Assistant Examiner — Nathanael T Zemui
(74) Attorney, Agent, or Firm — Beusse Wolter Sanks & Maire

(57) ABSTRACT

A storage structure of an electrical metal-air energy storage cell is provided having an active storage material. The storage structure has a core region and at least one shell region, wherein the material in the core region has a higher porosity than the material of the shell region.

18 Claims, 2 Drawing Sheets

(51) Int. Cl.
*H01M 4/134* (2010.01)
*H01M 4/52* (2010.01)
*H01M 4/62* (2006.01)
*H01M 12/08* (2006.01)
*H01M 4/02* (2006.01)

(52) U.S. Cl.
CPC ............ *H01M 4/62* (2013.01); *H01M 12/08* (2013.01); *H01M 2004/021* (2013.01); *Y02E 60/128* (2013.01)

(56) References Cited

U.S. PATENT DOCUMENTS

| | | | |
|---|---|---|---|
| 2007/0077491 | A1 | 4/2007 | Burchardt |
| 2009/0169957 | A1 | 7/2009 | Harada |
| 2011/0033769 | A1* | 2/2011 | Huang ................ H01M 12/005 429/465 |
| 2011/0256448 | A1 | 10/2011 | Huang |
| 2012/0048456 | A1 | 3/2012 | Harada |
| 2012/0058412 | A1 | 3/2012 | Harada |
| 2013/0183595 | A1 | 7/2013 | Zampieri |

FOREIGN PATENT DOCUMENTS

| | | | |
|---|---|---|---|
| DE | 2164208 | A1 | 7/1973 |
| DE | 112007000960 | T | 4/2009 |
| WO | 2011019455 | A1 | 2/2011 |
| WO | 2012033623 | A1 | 3/2012 |
| WO | 2012034042 | A2 | 3/2012 |
| WO | 2012038312 | A1 | 3/2012 |
| WO | 2012177359 | A1 | 12/2012 |
| WO | 2013104615 | A1 | 7/2013 |
| WO | 2013110509 | A2 | 8/2013 |

* cited by examiner

STORAGE STRUCTURE OF AN ELECTRICAL ENERGY STORAGE CELL

CROSS REFERENCE TO RELATED APPLICATIONS

This application is the US National Stage of International Application No. PCT/EP2013/061395 filed 3 Jun. 2013, and claims the benefit thereof. The International Application claims the benefit of German Application No. DE 102012211474.2 filed 3 Jul. 2012. All of the applications are incorporated by reference herein in their entirety.

FIELD OF INVENTION

The invention relates to a storage structure of an electrical energy storage cell.

BACKGROUND OF INVENTION

Surplus electrical power originating, for example, from renewable energy sources can be stored in the power grid only to a limited degree. This also applies to surplus power which is obtained in fossil power plants when they are running within the optimal economic load range but the power is not being demanded by the consumer from the grid. There are various large-scale storage devices for intermediate storage of this surplus power in relatively large amounts. One of these is, for example, a pumped storage power plant. In the battery sector, one approach for electrical energy storage means is to use rechargeable oxide batteries (ROB), i.e. high-temperature metal/air batteries. In these batteries, a metal-based storage medium is reduced or oxidized according to the state of the battery (charging or discharging). In the course of a multitude of these cyclical charging and discharging operations, i.e. oxidation and reduction operations, of the storage medium, there is a tendency in this medium, at the comparatively high operating temperatures to which such a battery is subjected, which are typically between 600° C. and 900° C., for the required microstructure, especially the pore structure of the storage medium and the particle size distribution of the active storage material, to be destroyed by sintering processes. This leads to aging and subsequently to failure of the battery.

SUMMARY OF INVENTION

A problem addressed by the invention is that of providing a storage structure for an electrical energy storage cell which has a higher long-term stability and withstands a higher number of cycles of charging and discharging operations compared to the prior art.

A solution to the problem includes a storage structure of an electrical metal/air energy storage cell having the features of the independent claim.

The energy storage cell comprising inventive storage structure is part of an electrical metal/air battery. Such a metal/air battery generally comprises a plurality of energy storage cells which are generally combined in turn to form stacks. The storage structure itself in turn comprises an active storage material, and it is notable in that the storage structure has a core region and at least one shell region, the material in the core region having a higher porosity than the material of the shell region. The result of this is that the active storage materials of the shell and core regions have different oxidation rates.

If the material of the core region has a higher oxidation rate than the material of the shell region, the basic construction of the storage structure with a separation of core region and storage region results at first in chemical conversion, i.e. oxidation, of the storage material in the core region. The oxidation induces an increase in volume, which in turn leads to constriction of pores which are required for transport of a so-called shuttle gas, or disappearance thereof with time. It is therefore more favorable that the core region of the storage structure is oxidized or chemically converted more quickly than the shell region. The shell region, even after advanced oxidation of the storage material in the core region, accordingly still has sufficiently high porosity to transport the gas which enters into a reaction with the active storage material thereto. In this context, it is not necessary for the shell region to completely surround the core region. A layer-by-layer construction is also appropriate, but the shell region should, in terms of a flow pathway or diffusion pathway of a reaction gas, be disposed between the storage electrode and the core region.

It has been found to be particularly appropriate for the storage region both in the shell region and in the core region to be based on iron and/or iron oxide. The iron oxide is typically in the form of $Fe_2O_3$ (iron(III) oxide) in the course of production of the storage structure; during the operation of the storage cell, the oxidation state of the iron generally changes, and for that reason the storage cell is operated with the compounds FeO (iron(II) oxide) and/or $Fe_3O_4$ (iron(II, III) oxide). The active storage material is especially in the form of a redox pair consisting of iron and iron oxide, the proportion of the respective components being dependent on the charge state of the electrical storage cell.

In a further advantageous configuration of the invention, the storage material is doped in the shell region, the doping comprising one or more elements from the group of chromium, cobalt, aluminum, silicon, titanium and manganese. This kind of doping can influence the oxidation rate of the storage material. It has been found that the elements from the group mentioned slow the oxidation rate of the storage material. It is therefore appropriate to provide the shell region with doped substances which results in a reduction in the oxidation rate.

Conversely, it has been found to be appropriate to provide the core region with doping comprising one or more elements from the group of molybdenum, vanadium, boron and bismuth. Doping with the substances mentioned leads to acceleration of the oxidation. These elements as dopants, in combination with the higher porosity of the core region, contribute to preferential oxidation of the core region.

For this purpose, it has been found to be appropriate for the storage material in the shell region to have a porosity of less than 40%. It may likewise be appropriate for the storage material in the core region, in which there is a higher porosity, to have a porosity of less than 50%.

It has also been found to be appropriate for the active storage material in the shell region and in the core region to have a particle size distribution having a d50 of less than 5 µm and a d90 of less than 10 µm. This particle size distribution is the particle size distribution of the starting materials of the active storage material for the storage structure. In the finished storage structure, the individual grains of the active storage material are in compressed or pre-sintered form, such that, at the microscopic level, there is formation of agglomerates or of cohesive bonds in contact regions, which are also referred to as sinter necks. The individual grains can therefore be bonded by a thermal treatment to the contact regions as a result of diffusion processes, the result of which is that they become visible by microscope as large grains. Therefore, the active storage material is characterized in physical terms using the particle size distribution of the starting material, this particle size distribution being reflected, albeit with cohesive contact faces, in the microstructure of the finished storage material or the finished storage structure.

In addition, it has been found to be appropriate for the storage material in the shell region and in the core region to include an inert material incorporated therein. In this context, the term "inert" is understood to mean that a chemical equilibrium between the inert material and any possible reactant is established so slowly that there are no reactions at the prevailing operating temperatures that have a lasting effect on the functionality of the storage structure. This is especially understood to mean inert behavior with respect to a gaseous or liquid reactant which in turn enters into a reaction with the storage material. Moreover this is understood to mean inert behavior with respect to the storage material per se. More particularly, useful inert materials, as well as other ceramic materials, are zirconia, yttrium-stabilized zirconia, alumina, yttria, calcium oxide, ceria or magnesium oxide, and combinations thereof.

In a further configuration of the invention, the inert material has a particle size distribution having a d50 of between 30 nm and 500 nm and a d90 of less than 2 μm.

In addition, it has been found to be appropriate to arrange a porous barrier layer between the shell region and the core region. This barrier layer serves to mutually delimit the core region and the shell region and especially prevents diffusion of the different dopants in the core region and the shell region.

The barrier layer may comprise an already mentioned inert ceramic material based on zirconia, yttrium-stabilized zirconia, alumina, yttria, calcium oxide, ceria or magnesium oxide, and may have a porosity of more than 40% by volume and a layer thickness of less than 1 mm, advantageously of less than 500 μm.

The volume ratio of the core region on the one hand and the shell region on the other hand may vary according to the size of the storage structure itself, since the geometry and the size of the storage structure define the diffusion pathways that have to be taken by the reaction gas which reacts with the storage medium. It has been found that a volume ratio of shell region to core region is between 10:1 and 1:10.

Further features of the invention and further advantages are elucidated in detail with reference to the figures which follow. The description of the figures comprises illustrative configurations of the invention which do not constitute a restriction of the scope of protection.

DETAILED DESCRIPTION OF INVENTION

Figure 1:
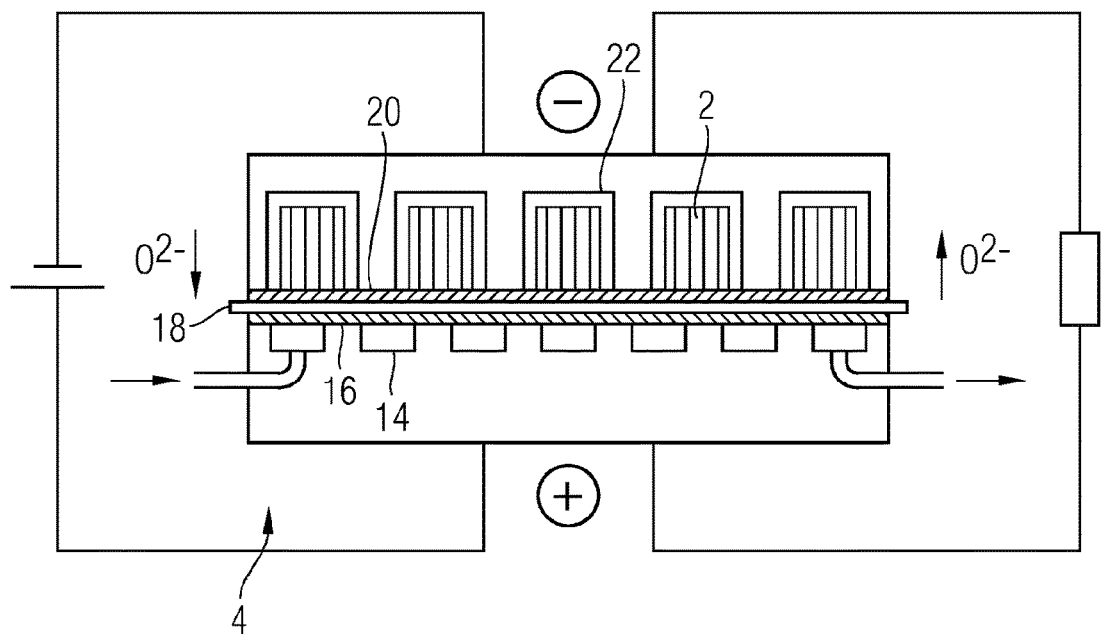
FIG. 1 a schematic diagram of the way in which an electrical storage cell works, FIG. 2 a storage structure with a core region and shell region with the core region fully surrounded by the shell region, FIG. 3 a storage structure with a core region and shell region, produced by a lamination process.

With reference to FIG. 1, there will first of all be a description, in schematic form, of the way in which a rechargeable oxide battery (ROB) works, to the extent necessary for the present description of the invention. A standard setup of an ROB involves blowing in a process gas, especially air, via a gas supply 14 at a positive electrode, which is also referred to as air electrode 16, with removal of oxygen from the air in the course of discharging (circuit on the right-hand side of the figure). The oxygen passes in the form of oxygen ions $O^{2-}$ through a solid electrolyte 18 that adjoins the positive electrode to a negative electrode 20, which is also referred to as storage electrode. The latter is connected to a porous storage medium via a gaseous redox pair, for example a hydrogen-water vapor mixture. If an impervious layer of the active storage material were to be present on the negative electrode 20, the storage capacity of the battery would thus rapidly be exhausted.

For this reason, it is appropriate to use a storage structure 2 made from porous material as energy storage medium at the negative electrode 20, the latter containing a functionally active oxidizable material as an active storage material 6, advantageously in the form of iron and/or iron oxide.

By means of a redox pair which is gaseous in the operating state of the battery, for example $H_2/H_2O$, the oxygen ions transported through the solid-state electrolyte 18, after they have been discharged at the negative electrode in the form of water vapor, are transported through pore channels in the porous storage structure 2 comprising the active storage material 6. According to whether a discharging or charging operation is in progress, the metal or the metal oxide (iron/iron oxide) is being oxidized or reduced and the oxygen required for that purpose is being supplied by the gaseous redox pair $H_2/H_2O$ or is being transported back to the solid-state electrolyte 18 or to the negative electrode 20. This mechanism of oxygen transport via a redox pair is referred to as the shuttle mechanism.

The advantage of iron as oxidizable material, i.e. as active storage material 6, is that it has about the same open-circuit voltage of about 1 V in its oxidation process as the redox pair $H_2/H_2O$ at a partial pressure ratio of 1; otherwise, an increased resistance arises for oxygen transport as a result of the diffusing components of this redox pair.

The diffusion of the oxygen ions through the solid-state electrolyte 18 requires a high operating temperature of 600 to 900° C. in the ROB described, but this temperature range is also advantageous for the optimal composition of the $H_2/H_2O$ redox pair in equilibrium with the storage material. In this context, it is not just the structure of the electrodes 16 and 20 and of the electrolyte 18 that is subject to a high thermal stress, but also the storage structure 2 comprising the active storage material 6. In the constant cycles of oxidation and reduction, the active storage material has a tendency to sinter and/or to become coarser. Sintering means that the individual grains fuse together to an ever greater extent through diffusion processes, the reactive surface area falls and the continuously open pore structure required for the gas transport disappears. Coarsening means that individual grains grow at the expense of other grains, with a decrease in the numerical density and the reactive surface area of the grains. In the event of a closed pore structure, the $H_2/H_2O$ redox pair can no longer reach the active surface of the active storage material 6, and so the internal resistance of the battery becomes very high even after a partial discharge of the storage means, which prevents further discharge from being technically viable.

One advantage of the ROB is that it can be extended in a virtually unlimited modular manner by virtue of its smallest unit, namely the storage cell. Thus, a small battery for stationary domestic use can be executed, as can an industrial scale system for storage of the energy from a power plant.

Figure 2:
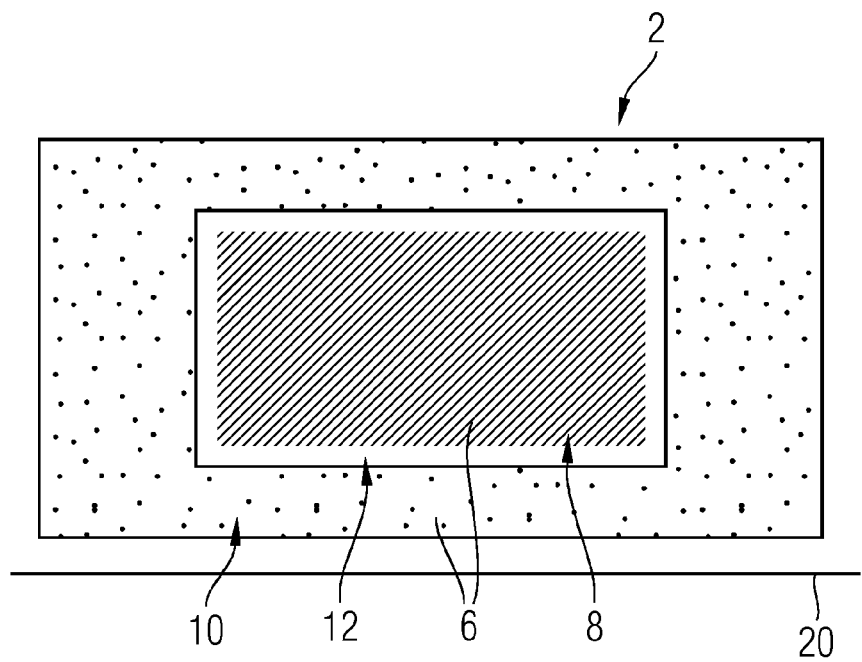

FIG. 2 shows, in schematic form, a storage structure 2 having a core region 8 and a shell region 10, with core region 8 and shell region 10 separated by a barrier layer 12. Both regions, core region 8 and shell region 10, have a storage material 6 based essentially on iron and/or iron oxide. The core region 8 has a porosity of 48%, and the iron oxide, i.e. the storage material 6, has been doped with molybdenum. The overall proportion of molybdenum doping is at a concentration of less than 10 mol %. The molybdenum acts as an oxidation accelerator, and the iron oxide or iron is brought to a higher oxidation state on contact with the $H_2/H_2O$ shuttle gas more quickly than would be the case without the addition of molybdenum.

Around the core region 8 is arranged the barrier layer 12 which has a thickness of 400 μm and comprises an inert material based on zirconia. It has a porosity of likewise 48%. Arranged around the barrier layer 12 is the shell region 10 which likewise comprises a mixture of iron and iron oxide, doped in this case with chromium or cobalt. These dopants act as reaction inhibitors and slow the reaction rate of the oxidation of the iron or iron oxide. In this manner, the core region 8 is fully oxidized up more quickly than the shell region 10. If the pores in the core region 8 have constricted or closed as a result of the increase in volume during the oxidation to such a degree that the shuttle gas can now reach the core region only with difficulty, if at all, and/or the active storage material has reached the highest possible oxidation state under the prevailing conditions, the oxidation reaction in the core region is essentially complete.

In parallel to the reaction in the core region 8, the reaction in the shell region 10 proceeds in a retarded manner. Because of the inhibitors, this reaction proceeds more slowly than the reaction in the already exhausted core region 8. The battery is fully discharged when the iron or iron oxide in the storage structure has been brought completely into the highest possible oxidation state, or when all the pore channels that are needed for the flow of the $H_2/H_2O$ shuttle gas have been constricted or closed to such an extent that the gas can no longer adequately fulfill its transport function. In the optimal case, when diffusion breaks down because of closed pores, the entire active storage material 6 has been fully oxidized. In this case, the battery is completely discharged. In a charging operation, the iron oxide is reduced again and oxygen ions are released back to the environment via the storage electrode 20, the solid electrolyte 18 and the air electrode 16. The iron is then back in elemental form or in the form of iron oxide with a relatively low oxidation state.

Figure 3:
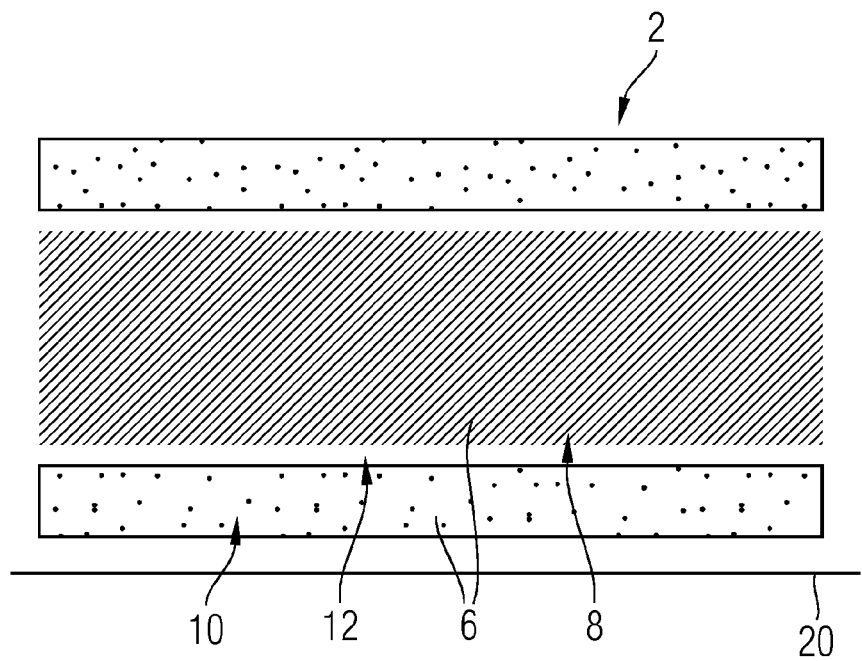

The storage structure as shown in FIG. 2 can be produced, for example, by an isostatic or uniaxial compression process. This involves first compressing the core material and optionally mechanically consolidating the green body thus formed by a sintering operation. Subsequently, the material of the barrier layer can optionally be applied, for example, by a CVD deposition operation. The green body thus coated is then introduced into a press once more, where it is surrounded by the pulverulent storage material 6 of the shell region 10 to be formed. This bed of powder is compressed once more with the green body within, resulting, after demolding and optionally after a further heat treatment for consolidation of the shell region 10, in the storage structure 2 depicted in FIG. 2. FIG. 3 shows a storage structure 2 produced by a layering process. This involves first producing the shell region 10 by a tape casting process, onto which the storage material 6 of the core region 8 is poured in turn and cured. In a further process step, a further shell region is applied to the core region by tape casting.

The individual layers shown in FIG. 3 can also be produced individually and then laminated. In this case, it is optionally possible in each case to apply the barrier layer 12 to the core region 8, for example by a deposition process.

The invention claimed is:

1. An electrical energy storage cell comprising an air electrode configured for fluid flow communication with an air supply, an active storage material, and a solid state electrolyte disposed between the air electrode and the active storage material, the storage cell characterized by:
    a first region of the active storage material; and
    a second region of the active storage material;
    wherein the first region has a higher porosity than the second region;
    wherein the first region comprises a core region and the second region comprises a shell region, and further comprising a porous barrier layer disposed between the core region and the shell region.

2. The electrical energy storage cell as claimed in claim 1, wherein the active storage material in the shell region and in the core region comprises iron and/or iron oxide.

3. The electrical energy storage cell as claimed in claim 1, wherein the active storage material in the shell region is doped, the doping comprising one or more elements from the group of chromium, cobalt, aluminum, silicon, titanium and manganese.

4. The electrical energy storage cell as claimed in claim 1, wherein the active storage material in the core region is doped, the doping comprising one or more elements from the group of molybdenum, vanadium, boron and bismuth.

5. The electrical energy storage cell as claimed in claim 1, wherein the active storage material in the shell region has a porosity of less than 40%.

6. The electrical energy storage cell as claimed in claim 1, wherein the active storage material in the core region has a porosity of less than 50%.

7. The electrical energy storage cell as claimed in claim 1, wherein the active storage material in the shell region and in the core region has a particle size distribution having a d50 of less than 5 μm and a d90 of less than 10 μm.

8. The electrical energy storage cell as claimed in claim 1, further comprising
    an inert material incorporated in the active storage material of the shell region and of the core region.

9. The electrical energy storage cell as claimed in claim 8, wherein the inert material is based on zirconia, yttrium-stabilized zirconia, alumina, yttria, calcium oxide, ceria or magnesium oxide or combinations thereof.

10. The electrical energy storage cell as claimed in claim 8, wherein the inert material has a particle size distribution having a d50 of between 30 nm and 500 nm and a d90 of less than 2 μm.

11. The electrical energy storage cell as claimed in claim 10, wherein the porous barrier layer comprises inert ceramic material.

12. The electrical energy storage cell as claimed in claim 10, wherein the porous barrier layer has a thickness of less than 1 mm.

13. The electrical energy storage cell as claimed in claim 10, wherein the porous barrier layer has an open porosity of more than 40%.

14. The electrical energy storage cell as claimed in claim 1,
   wherein a volume ratio between the shell region and core region is in a range between 10:1 and 1:10.

15. The electrical energy storage cell as claimed in claim 11,
   wherein the inert ceramic material is based on zirconia, yttrium-stabilized zirconia, alumina, yttria, calcium oxide, ceria or magnesium oxide or combinations thereof.

16. The electrical energy storage cell as claimed in claim 10,
   wherein the porous barrier layer has a thickness of less than 500 µm.

17. The electrical energy storage cell as claimed in claim 1, wherein the first region comprises a dopant effective to accelerate oxidation of the active storage material of the first region during charging of the electrical energy storage cell.

18. An electrical energy storage cell comprising an air electrode configured for fluid flow communication with an air supply, an active storage material, and a solid state electrolyte disposed between the air electrode and the active storage material, the storage cell characterized by:
   a first region of the active storage material; and
   a second region of the active storage material;
   wherein the first region has a higher porosity than the second region;
   wherein the second region comprises a dopant effective to slow oxidation of the active storage material of the second region during charging of the electrical energy storage cell.

* * * * *